(12) United States Patent  (10) Patent No.: US 8,662,262 B1
Decker, Jr.  (45) Date of Patent: Mar. 4, 2014

(54) BRAKE ACTIVATION SYSTEM AND METHOD

(75) Inventor: Daniel L. Decker, Jr., Castle Rock, CO (US)

(73) Assignee: Danko Manufacturing LLC, Sedalia, CO (US)

( * ) Notice: Subject to any disclaimer, the term of this patent is extended or adjusted under 35 U.S.C. 154(b) by 382 days.

(21) Appl. No.: 13/047,603

(22) Filed: Mar. 14, 2011

(51) Int. Cl.
*B60T 7/20* (2006.01)

(52) U.S. Cl.
USPC .......................................... 188/112 R; 303/7

(58) Field of Classification Search
USPC .......... 188/112 R, 3 H, 3 R, 110, 135, 140 A, 188/140 R, 141; 303/3, 7, 12, 15, 20, 123
See application file for complete search history.

(56) References Cited

U.S. PATENT DOCUMENTS

| | | | | |
|---|---|---|---|---|
| 5,012,689 | A | * | 5/1991 | Smith ........................... 74/89.17 |
| 5,411,321 | A | * | 5/1995 | Harness ............................. 303/7 |
| 5,915,797 | A | * | 6/1999 | Springer ............................ 303/7 |
| 6,126,246 | A | * | 10/2000 | Decker et al. ...................... 303/7 |
| D477,533 | S | | 7/2003 | Kornick et al. |
| 6,634,466 | B1 | | 10/2003 | Brock et al. |
| 6,644,761 | B2 | * | 11/2003 | Schuck .......................... 303/123 |
| 6,681,620 | B2 | * | 1/2004 | Sakamoto et al. ............... 73/132 |
| D490,349 | S | | 5/2004 | Brock et al. |
| D498,190 | S | | 11/2004 | Brock et al. |
| 6,837,551 | B2 | | 1/2005 | Robinson et al. |
| 6,918,466 | B1 | | 7/2005 | Decker et al. |
| 6,959,793 | B2 | * | 11/2005 | Cinquemani ............. 188/112 R |
| D551,139 | S | | 9/2007 | Barnes et al. |
| D679,229 | S | * | 4/2013 | Decker, Jr. ................... D12/180 |
| 8,430,458 | B2 | * | 4/2013 | Kaminski et al. ................. 303/7 |
| 2004/0160117 | A1 | | 8/2004 | Brock et al. |
| 2005/0225169 | A1 | * | 10/2005 | Skinner et al. ................ 303/123 |

* cited by examiner

Primary Examiner — Pamela Rodriguez
(74) Attorney, Agent, or Firm — Blakely Sokoloff Taylor & Zafman LLP

(57) ABSTRACT

A brake activation system and method are described. In one example, an arm drive system of a brake activation system is activated to apply pressure to an actuation arm. The actuation arm is attached to a brake pedal of a towed vehicle and has a movable connection to a grip of the brake activation system. The applied pressure drives the grip away from the brake pedal. The grip grips a surface of the towed vehicle. The arm drive system is also activated to apply pressure to the actuation arm to drive the actuation arm toward the brake pedal, moving the connection to the grip.

38 Claims, 12 Drawing Sheets

BRAKE ACTIVATION SYSTEM AND METHOD

BACKGROUND

1. Field of the Invention

The present invention relates to assistance for towing vehicles and, in particular, features of towed vehicle brake activation systems.

2. Related Art

It is often convenient to tow one vehicle behind another. While the towed vehicle can be carried on a separate trailer, the trailer adds additional weight to the combination. For braking, a heavy trailer typically provides a separate braking system that can be controlled by the tow vehicle through a standardized interface. The trailer's brakes can significantly reduce the stopping distance of the combination by aiding the tow vehicle in stopping the combination. Unlike a trailer, a typical towed vehicle, such as an automobile, a car, or a truck, does not have a trailer braking system interface. To reduce stopping distances, however, auxiliary braking systems have been developed to activate the towed vehicle's independent braking system.

Auxiliary braking controller systems come in many different configurations. Some systems connect to a trailer brake controller on the tow vehicle. The system then emulates the response that would be provided by a trailer. Others act independently of the towed vehicle using sensors to determine when the tow vehicle is slowing down. These sensors may be coupled to the hitch bar or coupled in another way to the two vehicle. Recently accelerometers connected with the towed vehicle have been used to determine when the towed vehicle is being slowed by the tow vehicle. There are also different ways to activate the towed vehicle's brake system. More complex system electronically or hydraulically connect to the brake system to activate it or to boost pressure. A simpler system simply attaches to the towed vehicle's brake pedal and pushes the pedal to activate the brakes.

For use with recreational vehicles, portable auxiliary braking systems have been developed that can be placed on or in front of the driver's seat of the towed vehicle and then attached to the brake pedal. Such systems may also require connections for power, control, and auxiliary safety systems. When the user has arrived at a parking destination, the portable system is removed from the towed vehicle so that the towed vehicle can be driven. When the user is ready to move to a new destination, the portable system is reinstalled. Since the braking system might be installed and removed several times a day in some situations, size, weight, and ease of use are important design considerations. These same systems may also be used to tow vehicles using other vehicles in other contexts separate and apart from recreational vehicle use.

SUMMARY

A brake activation system and method are described. In one example, an arm drive system of a brake activation system is activated to apply pressure to an actuation arm. The actuation arm is attached to a brake pedal of a towed vehicle and has a movable connection to a grip of the brake activation system. The applied pressure drives the grip away from the brake pedal. The grip grips a surface of the towed vehicle. The arm drive system is also activated to apply pressure to the actuation arm to drive the actuation arm toward the brake pedal, moving the connection to the grip.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

DETAILED DESCRIPTION

A portable, easy-to-use, auxiliary brake activation system provides great benefits in highways safety for those who tow another vehicle and for those on the roads around them. By making the system easier to install, easier to use, and easier to store when not being used, the system is used more frequently. The more frequently it is used, the more likely it is to protect its users and other on the road. The brake activation system described below is not only compact, powerful, accurate, and easy to use, but it is easy to install and easy to remove.

Figure 1:
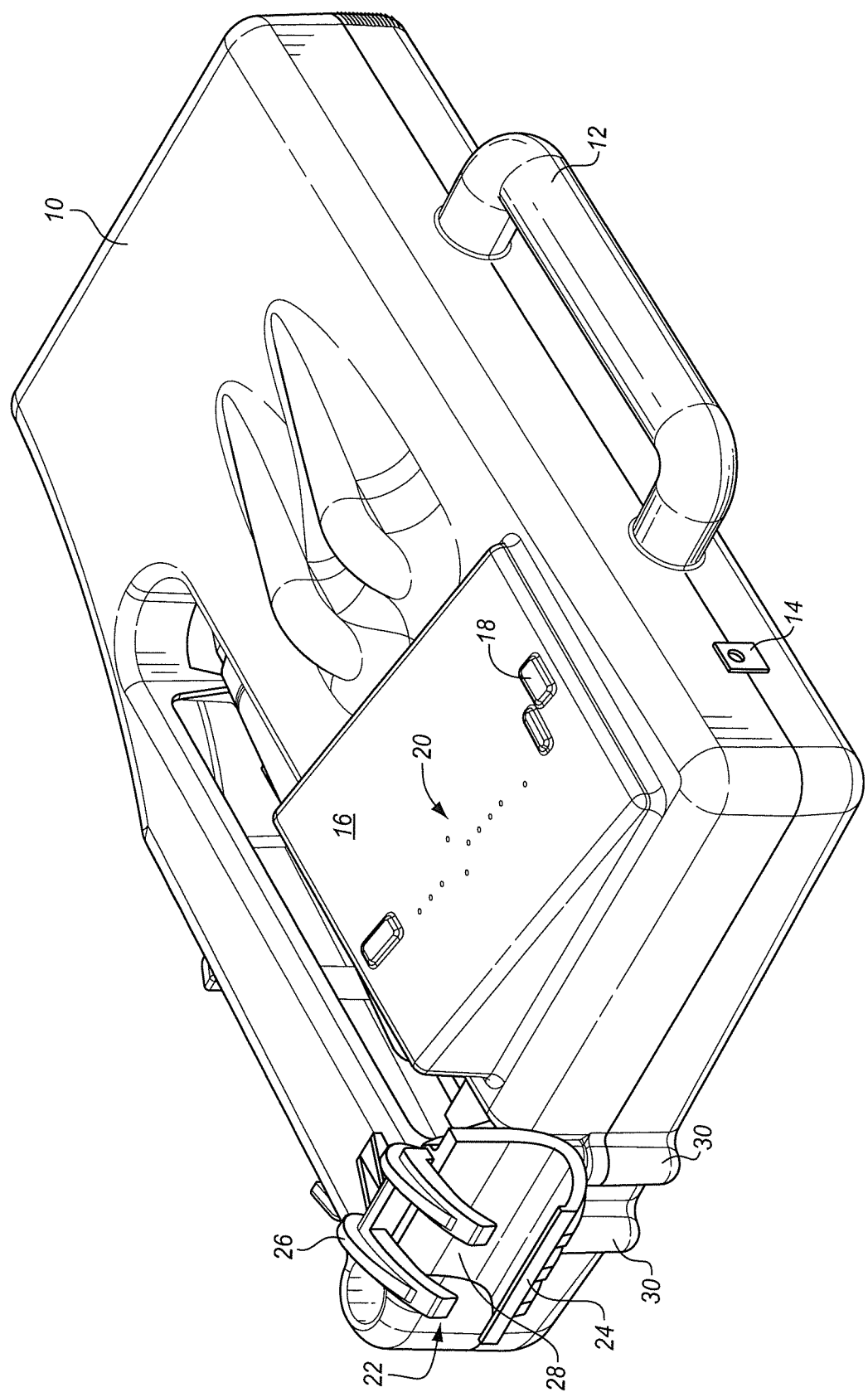
FIG. 1 is a front perspective view of a brake activation system showing my new design.

FIG. 1 shows a front perspective view of an example of a brake activation system according to one embodiment of the invention. The particular shape, size, and proportion may be modified to suit different applications, different vehicles and different tastes. In the illustrated embodiment, the system is configured to rest on the floor of a towed vehicle in front of the driver's seat as described in more detail later.

The system has a main housing 10 and a handle 12 to make it easy to carry and store. A safety socket 14 is provided for a connection to a tow bar. The safety socket receives a safety cable. In a typical example, the other end of the cable is attached to the tow vehicle. If the towed vehicle comes loose from the tow vehicle, then as the two vehicles move away, the cable will be pulled from the safety socket. The brake activation system, upon sensing this, applies the brakes to stop the runaway towed vehicle. The functions of the safety socket may be removed or provided in many other ways.

The system also features a control panel 16 on an outer surface of the main housing. The control panel includes a start/stop button 18 and various status and control indicator lights 20. Additional buttons and indicators may also be used. The particular nature of the control panel may be modified for aesthetic or functional reasons. In one example, the control panel is a touch screen. In another example, physical switches may be used. A remote control panel screen may also or alternatively be used depending on the particular implementation.

At the front of the housing, a brake pedal connector 22 extends for convenient access by the user. The brake pedal connector has a base 24 and a movable grip 26 attached to the base. In this example, the base has a main wall 28 to push against a brake pedal in a location where a foot would typically push, and a lower cupped curve to curve around the bottom of the brake pedal. The grip, in this example, is in the form of a clevis, although other configurations may be used.

The forks of the clevis extend up and out from the base to reach over and around the top of the brake pedal. When attached to a brake pedal, the connector holds the brake pedal between the forks at the top and the cupped curve of the base on the bottom. Because both the clevis and the cupped curve are curved or pronged to wrap around the back of the brake pedal, the connector remains attached whether the connector is pulling or pushing on the brake pedal. In other words, the connector allows the brake activation system to apply pressure on the brake pedal in two directions both towards and away from the brake pedal.

The connector is held in the storage position shown in FIG. 1 by a pair of pins extending from the bottom of the connector that are placed into a corresponding pair of retainers 30 in the main housing. The pins are not visible in this view as they are concealed by the retainers.

Figure 2:
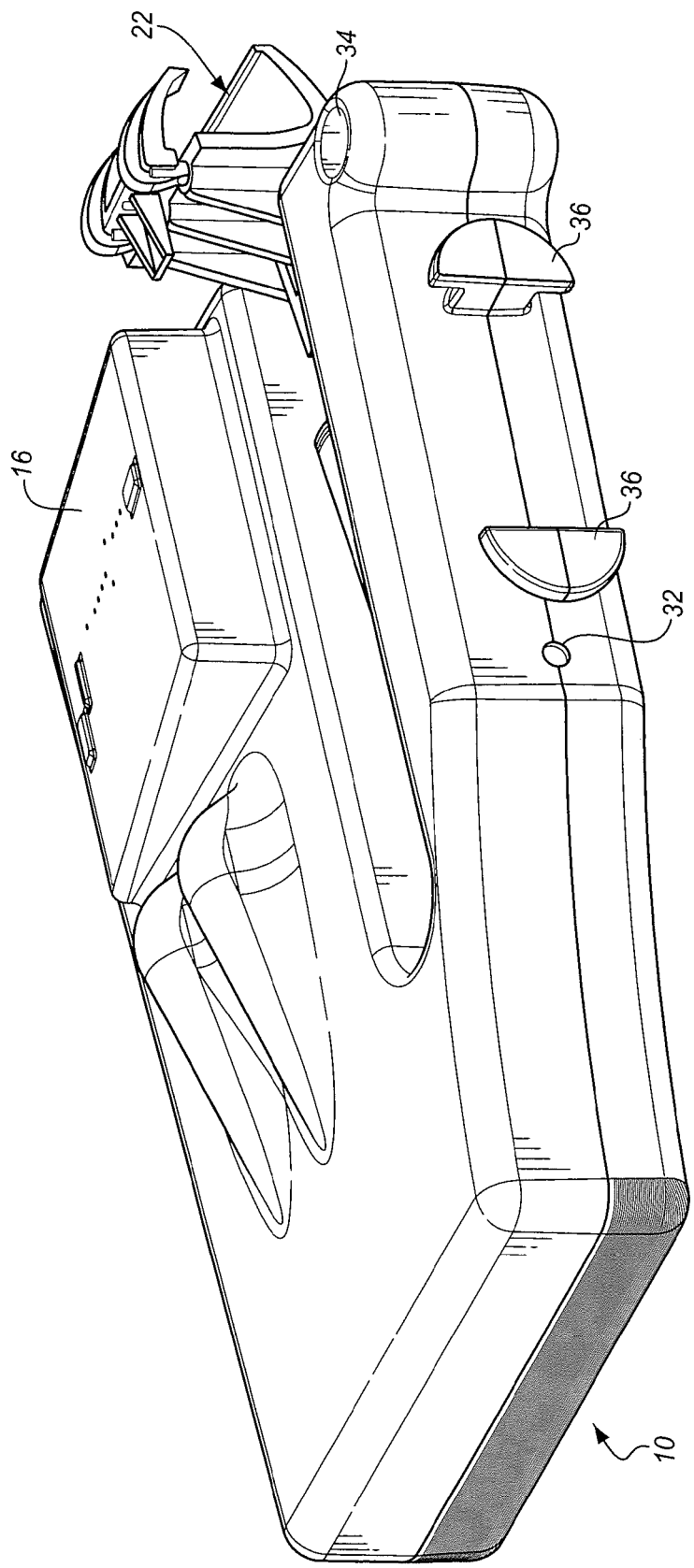
FIG. 2 is a rear perspective view of the system of FIG. 1.

FIG. 2 is a perspective view of the same example brake activation system from the opposite direction. In FIG. 2 a power socket 32 is shown to supply power to drive the system. In the illustrated example, a power cord (not shown) connects to the socket. The other end of the power cord may be a cigarette lighter plug or 12V power plug to connect to an automotive 12V power socket or receptacle.

Figure 3:
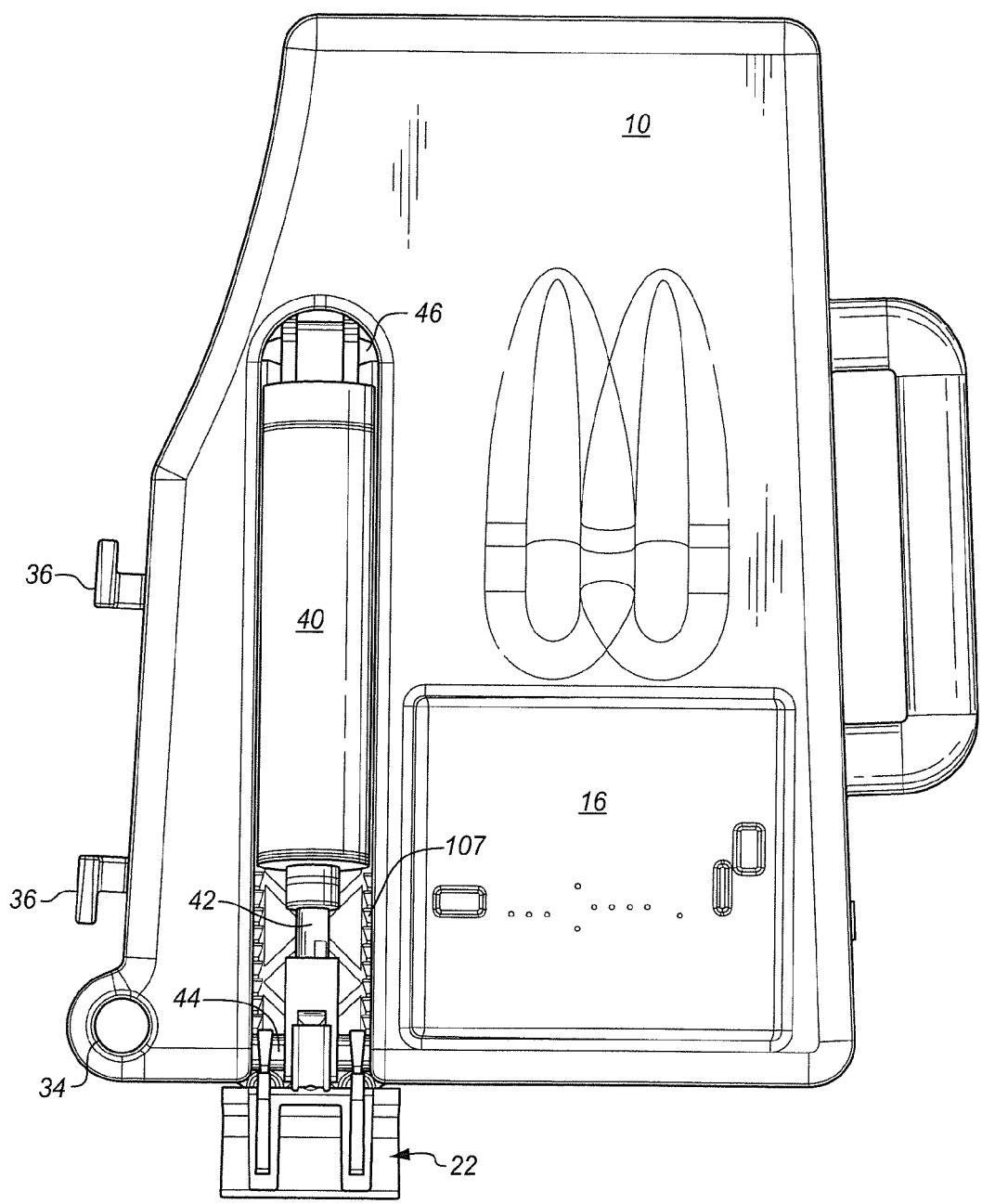
FIG. 3 is a top view of the system of FIG. 1.

In the illustrated example, the plug can be stowed in a cigarette lighter plug holder 34 and the cord can be wrapped around a pair of cleats 36 for storage. The cigarette lighter or 12V plug provides a convenient way to provide power in most types of towed vehicles, however any of a variety of other sources of power may be used depending on the particular implementation. FIG. 3 shows the cord cleats and the plug holder from a top view. In order to power the system, the plug is simply removed from the holder, the wire is unwrapped from the cleats and the plug is connected to any nearby 12V outlet in the vehicle. If the outlet already holds a cover or a cigarette lighter, then the cover can be removed and stored in the holder 34 of the braking system.

FIG. 3, a top elevation view of the brake activation system of FIG. 1 also shows an actuation arm 42 attached to the brake pedal connector 22 and an arm drive system 40 attached at one end to the actuation arm 42 and at the other end to the main housing 10. In the illustrated example, the actuation arm is a piston rod with a hinged connector 44 to the brake pedal connector base 24. The arm drive is a pneumatic cylinder 40. A piston attached to the piston rod and inside the cylinder is driven by an air compressor and valve control system (not shown) within the housing. The cylinder has a hinged track connector 46 within the main housing. The hinged connector of the brake pedal base allows the connector to change its position to accommodate different brake pedal angles. It also allows the brake pedal connector to move as the brake pedal is pressed. The hinged connection between the drive cylinder and the main housing allows the system to adapt to different brake pedal heights relative to the floor pan of the towed vehicle upon which the system rests while in use.

Figure 4:
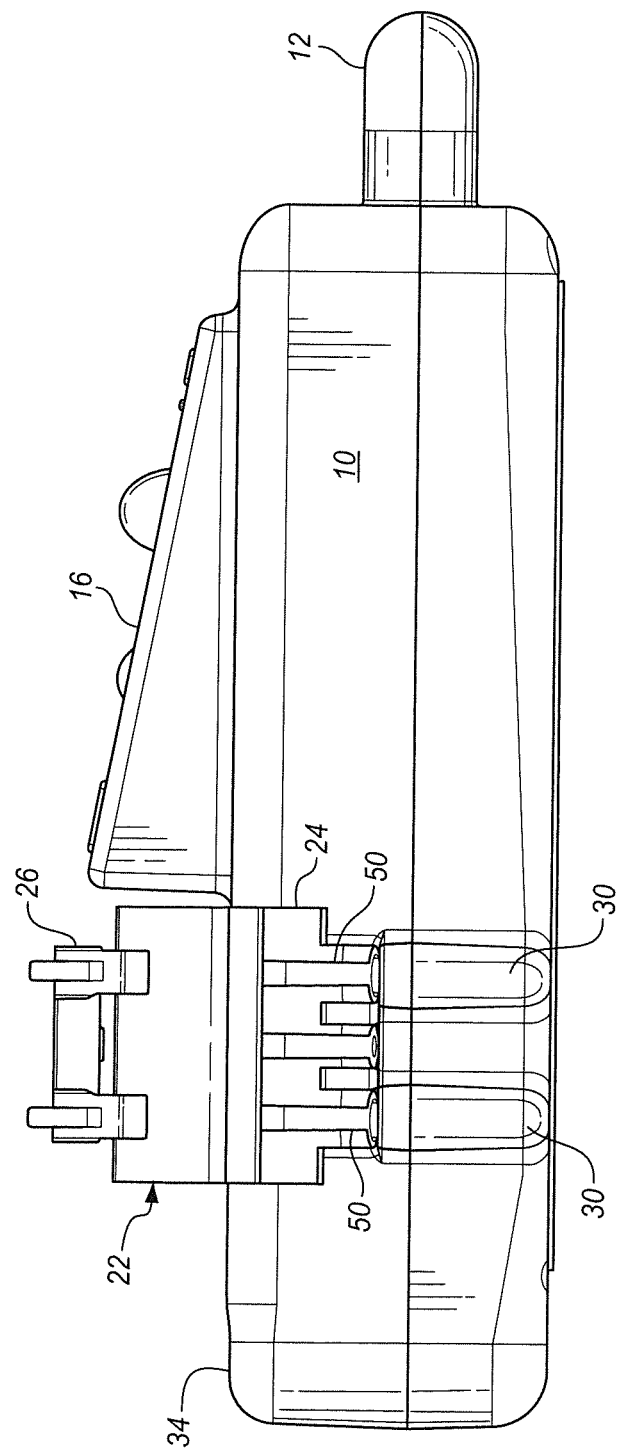
FIG. 4 is a front view of the system of FIG. 1.
Figure 5:
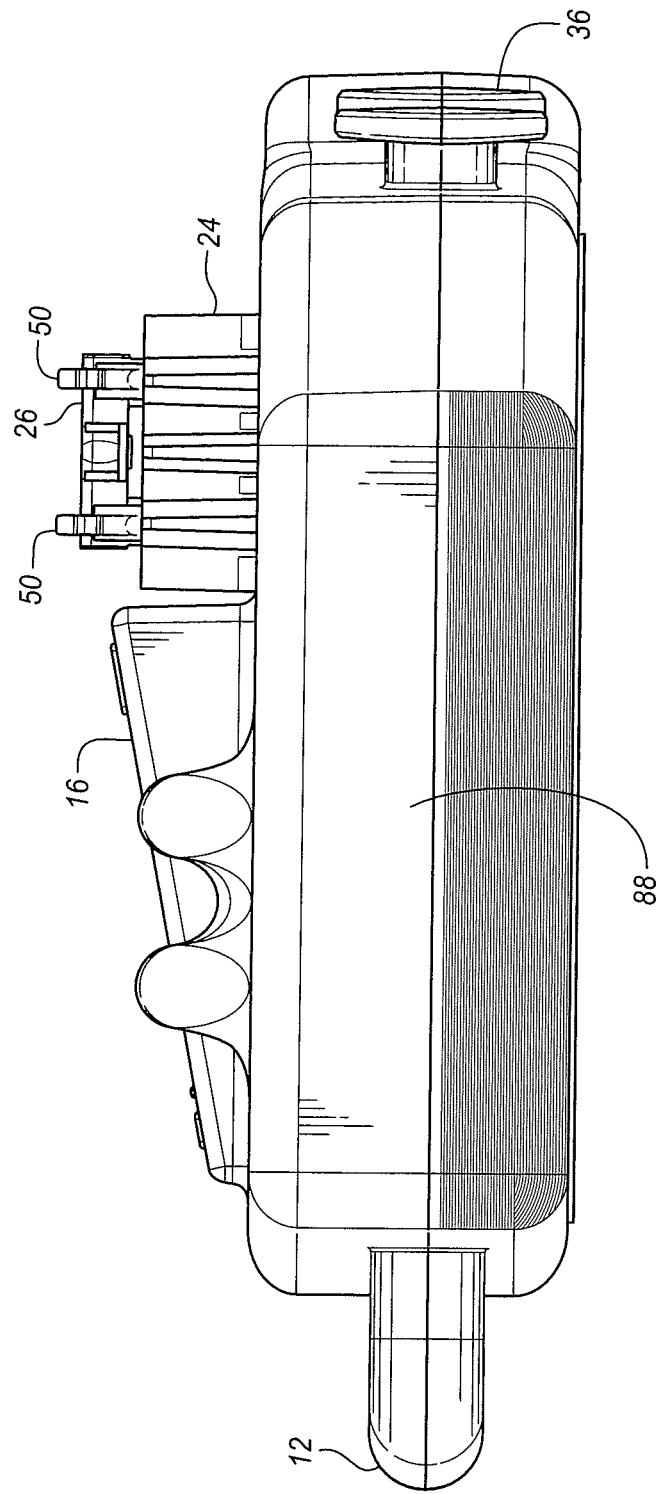
FIG. 5 is a back view of the system of FIG. 1.

FIG. 4 is a front elevation view of the brake activation system of FIG. 1. From this view the brake pedal connector is in its storage position in the main housing 10. Two retention pins 50 are shown extending from the upper clevis 26 of the connector 22 behind the base 24 to extend into the retainers 30. The pins hold the connector in place for storage and transportation. The pins can be seen behind the base 24 in the rear elevation view of FIG. 5 as well.

Figure 6:
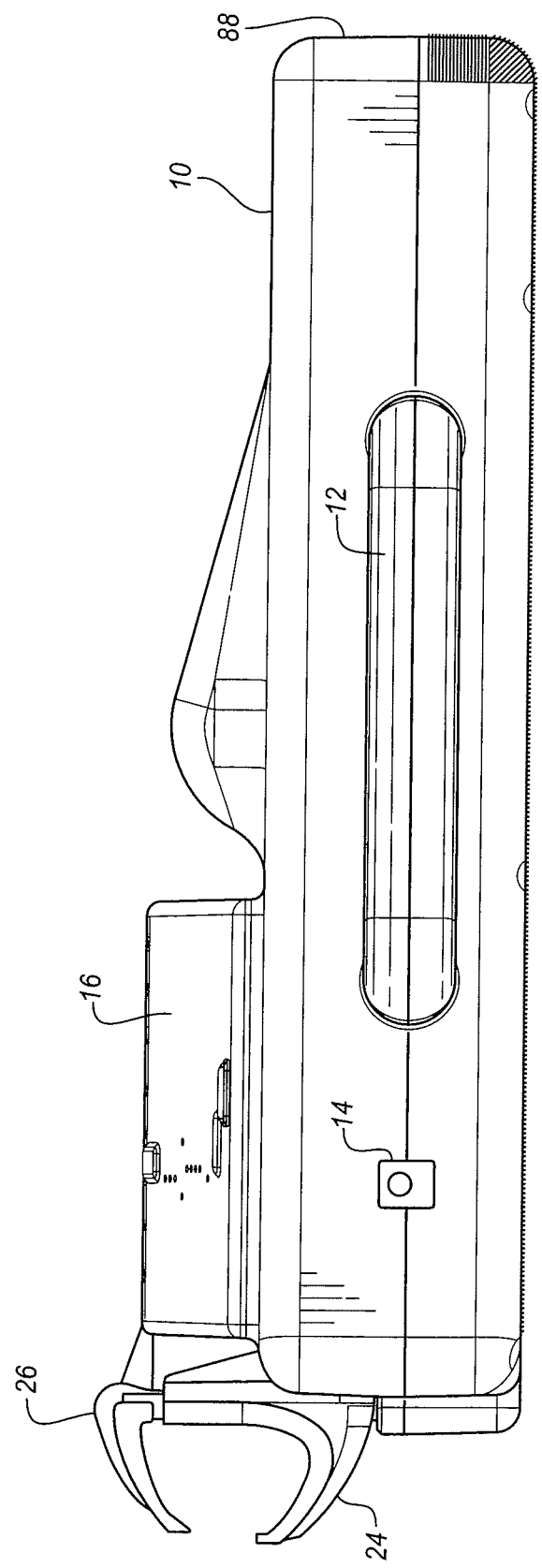
FIG. 6 is a right side view of the system of FIG. 1.
Figure 7:
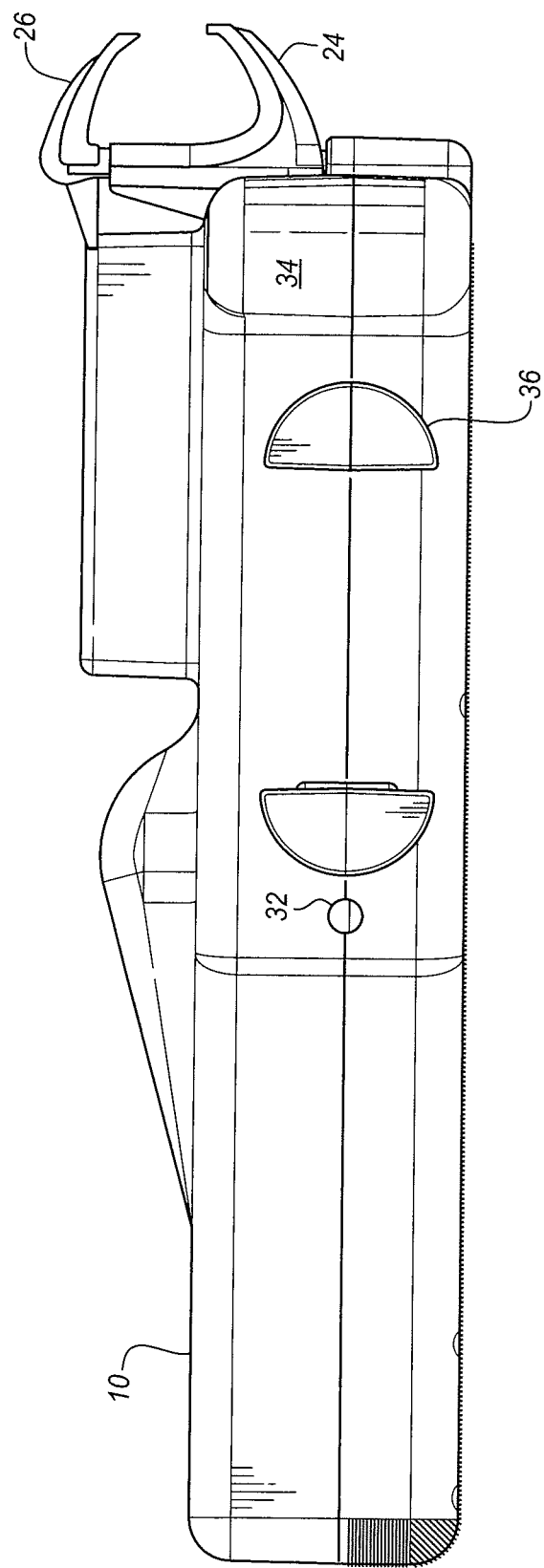
FIG. 7 is a left side view of the system of FIG. 1.

FIGS. 6 and 7 are side elevation views of the system of FIG. 1 showing the compact dimensions of the system. These dimensions make the system easy to carry by the handle 12 and easy to store when not in use.

Figure 8:
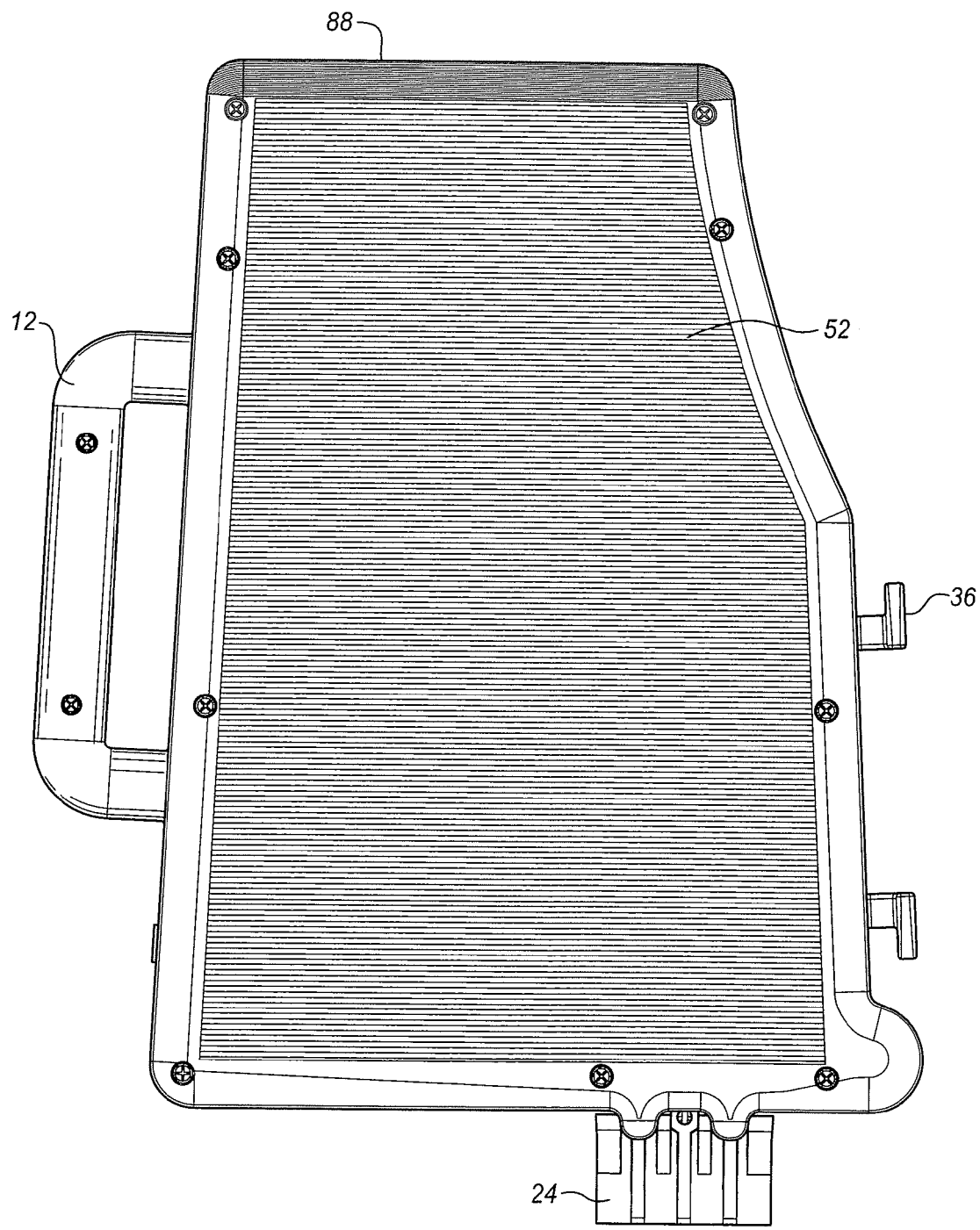
FIG. 8 is a bottom view of the system of FIG. 1.

FIG. 8 is a bottom elevation view of the system of FIG. 1. In this view the grooved rubber pad 52 on the bottom of the system can be seen. The grooved pad is intended to grip the floor of the towed vehicle. For a typical vehicle with a carpeted floor, the bottom surface may be covered with any elastomeric surface textured to grip the carpet. In the illustrated example, the grooves are transverse in order to resist longitudinal movement. In the towed vehicle, the brake pedal will be pushed longitudinally to activate or deactivate the brakes. The transverse grooves reduce longitudinal movement of the housing on the floor of the towed vehicle. In the illustrated example, any elastomeric material may be used, such as synthetic rubber, however, the choice of material and the surfacing may be adapted to suit different vehicles. Alternatively, other gripping surfaces may be used, for example small hooks, such as those for hook and loop fasteners, or a fixed mounting fixture may be used. Some vehicles, for example, have hooks or slots for attaching removable carpet or rubber mats. These, or a specific purpose-built connector, may be used to secure the housing into the floor pan of the towed vehicle.

Figure 9:
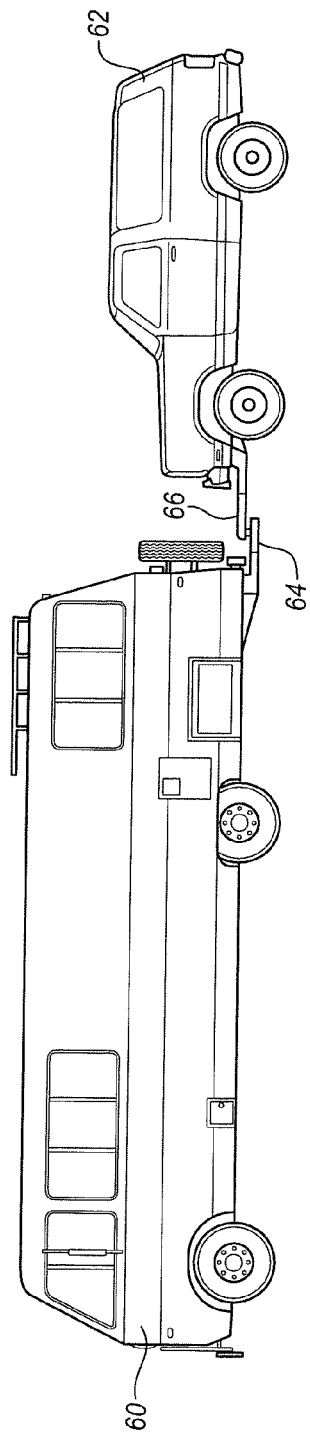
FIG. 9 is diagram of a tow vehicle and a towed vehicle suitable for use with embodiment of the present invention.

FIG. 9 is a drawing of a typical context in which a brake activation system such as that of FIG. 1 may be used. A tow vehicle 60, pulls a towed vehicle 62. In the illustration, the tow vehicle is a motor home and the towed vehicle is a light reconnaissance vehicle. However, the tow vehicle may be any type of car, truck, van, bus, or recreational vehicle and the towed vehicle may be any lighter vehicle with a conventional brake pedal activated system. The tow vehicle has a tow hitch 64 and the towed vehicle has a tow bar 66. The tow bar attaches to the hitch for towing. When the towed vehicle is unhitched for separate use, the tow bar is removed or folded out of the way.

Figure 10:
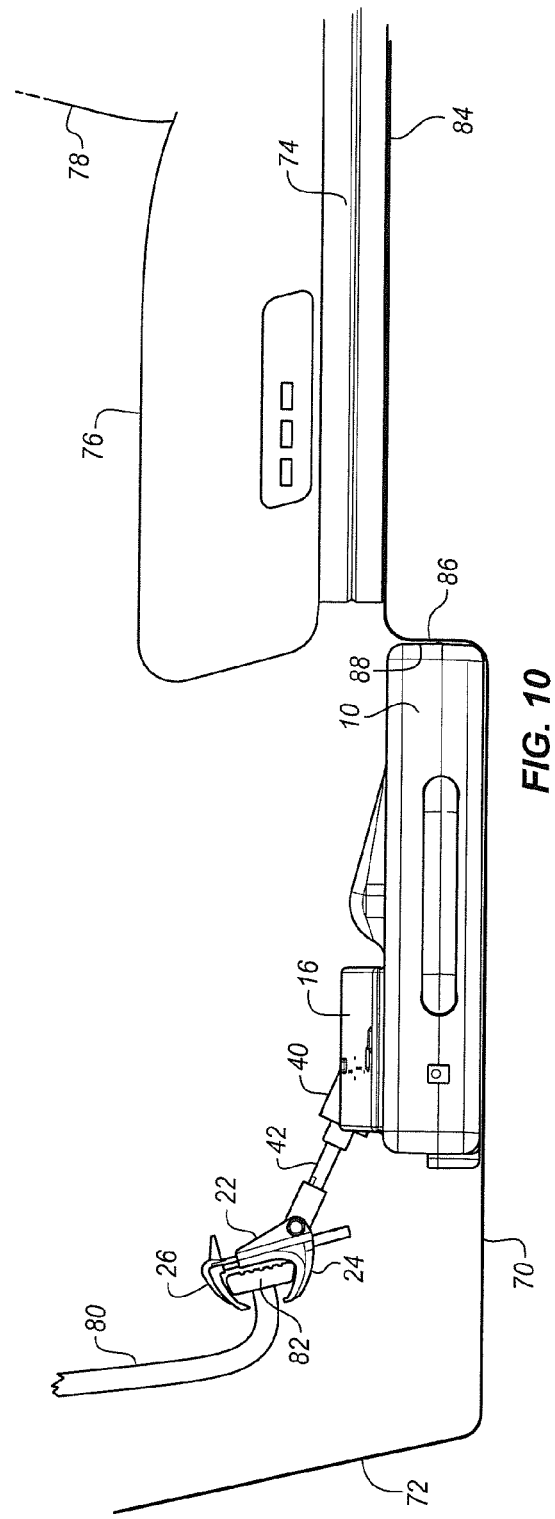
FIG. 10 is a side view of the system of FIG. 1 installed inside a towed vehicle.

FIG. 10 is a view of an example of an interior driver's area of a towed vehicle. In FIG. 10, the vehicle interior has a floor pan 70 which is typically, but not necessarily carpeted. The floor pan extends forwards to a firewall 72, between the interior and the engine compartment. It extends rearwards to a seat platform 84. The seat platform carries a seat rail 74 which supports the driver's seat 76 and seat back 78.

The floor pan has a ridge, or wall 86 at the edge of the seat platform. A back surface 88 of the brake activation system 10 is placed against this ridge. This helps to prevent the system 10 from moving backwards when the system presses against the brake pedal. Some vehicles have a flat floor pan in which the seat platform is not raised. In this case the back surface of the system 10 may rest against the driver's seat 76 or supporting seat rail 74. Alternatively, the system can rest on the floor pan without the back surface being braced against any surface.

The vehicle interior also has a brake pedal 82 suspended from a brake pedal arm 80 used to activate vehicle's independent braking system. The brake pedal is typically coupled though the brake pedal arm to a hydraulic reservoir so that when the brake pedal is pressed brake fluid is pushed out of the reservoir to drive brake pads against rotors or drums to slow or stop the wheels. However, the invention is not limited to any particular configuration or operation of the vehicle's braking system.

In FIG. 10, the connector 22 is shown attached to the brake pedal 82. The base 24 curves around the back of the brake pedal and the upper grip 26 reaches around and over the top of the brake pedal. Both portions allow the brake pedal to be grasped from behind and also to be pushed from in front. In one example, the grip is pressed towards the base against the brake pedal and is then locked in place. In another example, a spring (not shown) drives the grip towards the brace. To attach the connector, the user pushes the grip away from the base, moves the base around the back of the brake pedal and then releases the grip. The spring drives the grip toward the base to apply pressure on the top and bottom of the brake pedal and hold the connector in place.

The actuation arm 42 is coupled to the connector with a pivoting connector to allow the connector to conform to the angular position of the brake pedal. Since a brake pedal is typically mounted on a pivoting arm 80 with a pivot point (not shown) well above the floor pan, and the brake connector is mounted to an actuation arm with a pivot point on the brake activation system, as the brake pedal is pressed, it will rotate differently from the rotation of the brake connector. The pivoting connection 44 (See e.g. FIG. 3) between the brake pedal connector and the actuation arm allows the connector to move as the angular position of the brake pedal changes. The pivoting connection 46 between the drive cylinder 40 and the main housing 10 allows the brake pedal connector to move up and down as the brake pedal is depressed. It also allows the system to be used with brake pedals at different distances and heights from the floor pan.

Figure 11:
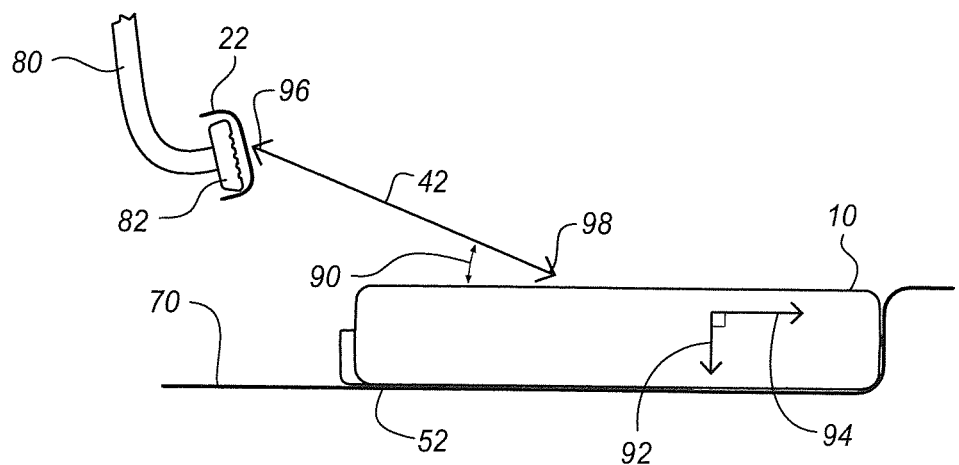
FIG. 11 is a diagram of forces and angles that may be present in the installation of FIG. 10.

FIG. 11 is a diagram of the vehicle interior of FIG. 10 to show the forces that are active when the brake pedal is pressed by the arm drive system. When the brake activation system pushes the vehicle brake pedal, the pneumatic cylinder 40 drives the actuation arm 42 away from the main housing 10 and toward the brake pedal 82 as shown by the arrow 96 of FIG. 11. The pushing is at an angle 90 between the main housing and the arm drive system that can vary with different vehicles.

The resistance of the brake pedal creates an equal and opposite force in the opposite direction as shown by the arrow 98. This force has two components, the horizontal and rearward component 94 drives the main housing against the seat platform 84 or against the driver's seat 76. This force is parallel to the flat portion of the vehicle floor pan and parallel to the bottom surface 52 of the main housing. If the bottom surface has ridges, or hooks, then these will resist movement of the system away from the brake pedal. If the back surface of the system is resting against a ridge in the floor pan for the seat platform, then this ridge will prevent the system from moving away from the brake pedal. The opposite force 92 also has a vertical and downward component in a direction normal to the bottom surface of the system. This component of the force will hold the main housing in place by pressing the bottom surface directly into the floor pan of the vehicle. The magnitude of the downward and vertical component can be increased relative to the rearward and horizontal component by lowering the pivot point of the actuation arm within the main housing 10.

The brake controller can be viewed as having a bottom surface 52 that engages the towed vehicle's floor pan 70 when the controller is installed into the towed vehicle. The actuation arm 42 extends away from the bottom surface and out of the main housing of the system where it is connected or attached to the towed vehicle's brake pedal 82. The actuation arm extends outwards in a direction partially normal to the bottom surface of the main housing in order to push on the brake pedal and actuate the brake system of the towed vehicle. The actuation arm is coupled through the arm drive system to the main housing and through the main housing to the bottom surface 52. As a result, pressing on the brake drives the actuation arm against the bottom surface in a direction partially normal to the bottom surface and in a direction partially parallel to the bottom surface. It has been found that brake activation system remain stationary in the floor pan of commonly used tow vehicles when the arm drive system drives the actuation arm against the bottom surface in a direction between 20 and 40 degrees from the plane of the bottom surface. However, larger or smaller angles may also be used. The configuration of the brake activation system can be modified to suit still larger or smaller angles.

Figure 12:
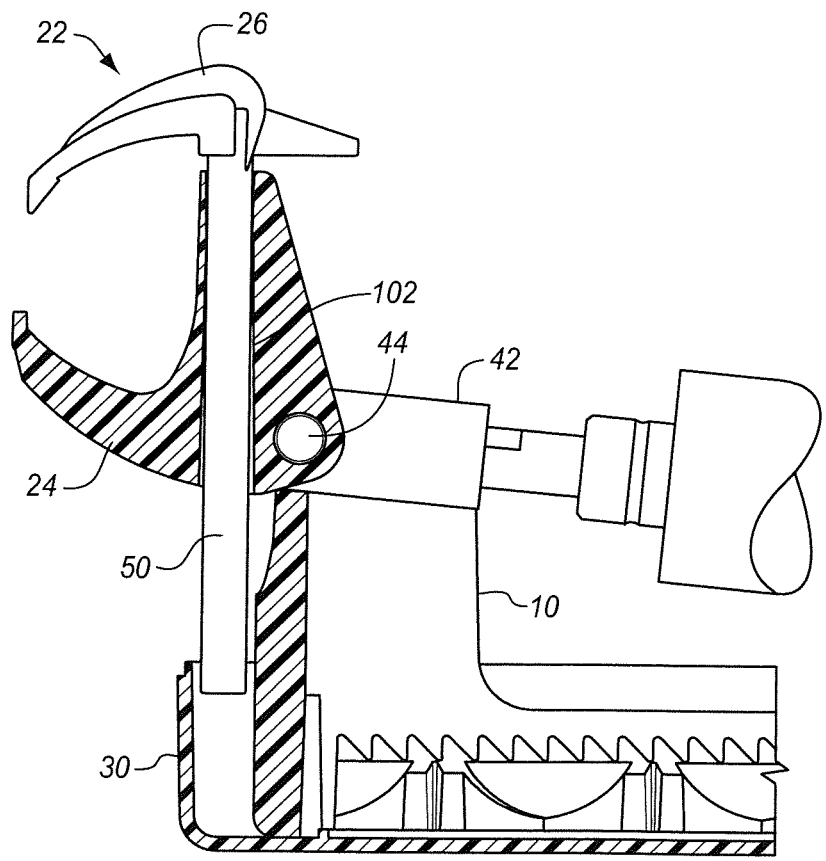
FIG. 12 is a cross-sectional view of the brake pedal connector of FIG. 1.

Referring to FIG. 12 a more detailed diagram of the brake pedal connector 22 is presented. The brake pedal connector is coupled to the actuation arm 42 through a pivot pin 44 which allows the connector to rotate about the actuation arm. The pivot pin extends roughly transversely with respect to the towed vehicle and parallel to the bottom surface of the brake activation system. The base 24 of the brake connector has guides 102 to receive the pins 50 of the upper grip. This allows the upper grip to move vertically with respect to the base to close over a brake pedal.

The connector 22 is shown in a closed position for storage in which the grip is resting against the base. It may be pulled upwards away from the base held in place by the guides to be placed around a brake pedal and then either clamped in place or held in place by a spring. The guide in the illustrated example is a cylindrical, elongated hole through the base. The pin is a cylindrical rod formed from or attached to the grip to extend into and through the guide. As shown, in the illustrated storage position, the pins 50 extend through and outside the guides. The end of the pin can therefore be inserted into the retainers 30 in the main housing. This allows the brake connector to be used to hold the actuation arm and drive system in place for storage and transport.

Figure 13:
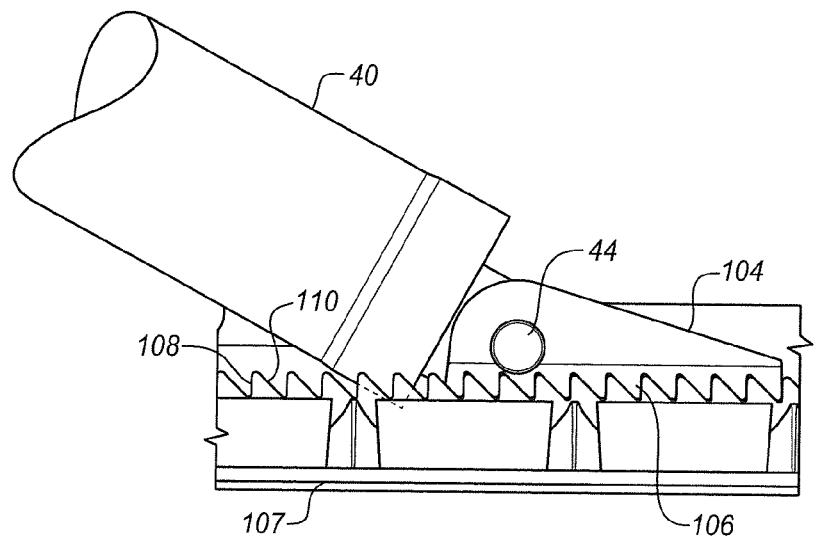
FIG. 13 is a side view of a cylinder anchor plate and a ratchet track of the system of FIG. 1.

FIG. 13 shows an opposite end of the actuation arm. In FIG. 13, the base of the pneumatic cylinder 40 is attached to an anchor 104. The anchor is attached through a pivot pin 44 which allows the brake pedal connector to be lifted up away from the main housing for use, or lowered into the main housing for storage. FIG. 1 shows the brake connector aim and arm drive in the lowered storage position, while FIG. 10 shows the arm and arm drive in the raised, installed position with the brake connector connected to a brake pedal.

The anchor has a ratcheted toothed base plate 106 on its bottom surface. The base plate engages a ratcheted toothed rail 107 (See also FIG. 3) mounted in the main housing 10. In one example the ratchet rail 107 is attached to the bottom plate of the housing for strength and to lower the position of the anchor relative to a brake pedal. The teeth of the rail and of the anchor are angled to allow for ratcheting. One side 108 of each tooth facing the direction of a brake pedal is vertical or nearly vertical. It may also be sloped toward the brake pedal. The other side 110 of each tooth is gently sloped, for example, at about 45 degrees from the vertical. The anchor has an interlocking inverse configuration to engage the rail at any position on the rail. While a toothed rail and plate are shown, any of a variety of other ratcheting, locking, or sliding mechanisms may be used instead, depending on the particular implementation.

As a result, the anchor plate can ride over the sloped sides 110 of each tooth toward the brake pedal, but cannot ride over the teeth away from the brake pedal. This allows the position of the anchor plate to be moved by pulling the arm drive 40 toward the brake pedal. When the arm drive has reached its position, it is locked into place. When the arm drive pushes the brake pedal, the anchor's bottom plate 106 will engage the ratchet rail to lock the arm drive in place. As long as the brake activation system housing remains in place the arm drive will effectively push against the brake pedal. To move the arm drive away from the brake pedal, it may be lifted so that the anchor clears the ratchet rail and then placed back onto the ratchet rail in the desired position, for example for storage.

Figure 14:
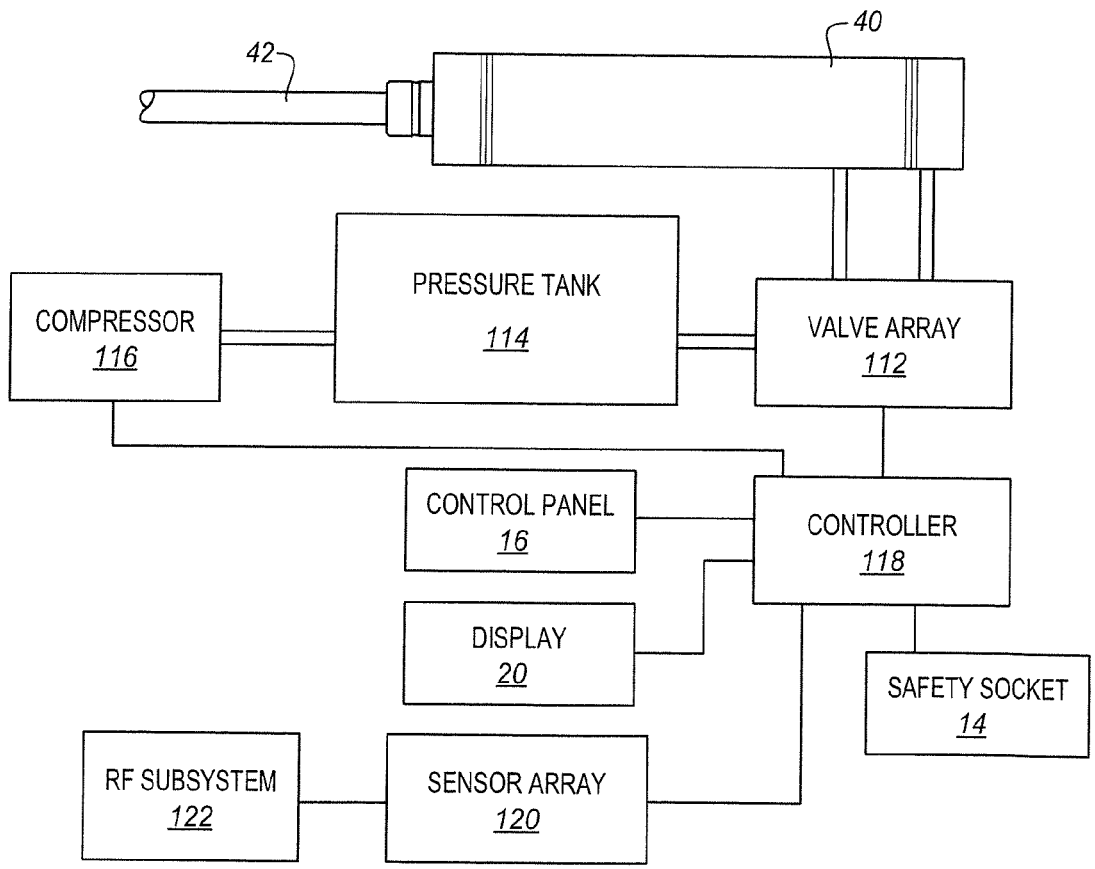
FIG. 14 is a block diagram of hidden components of the system of FIG. 1.

FIG. 14 is a block diagram of the internal operating components of the brake activation system of FIG. 1. The actuation arm or piston rod 42 is coupled to the arm drive or pneumatic cylinder 40 to press the brake pedal as described above. The pneumatic cylinder is controlled by a valve array 112 which is supplied by a pressure tank 114. Using the valve array, pressure from the tank can be supplied to the cylinder to move the piston in either direction. This drives the activation arm either toward or away from the brake pedal. The pressure tank is fed by a compressor 116. While the present invention is described as pneumatic, a hydraulic system may be used instead.

The entire system is controlled by a controller 118, typically in the form of a programmed microprocessor or microcontroller with embedded or discrete program instructions and operational memory. The controller is coupled to at least the compressor 116 and the valve array 112 to control the operation of the actuation arm. The control is coupled to the control panel 16 to receive commands and to the display 20 to indicate status and operation conditions. The controller is also coupled to the safety socket 14 to drive the actuation arm toward the brake pedal when the safety socket connection is lost.

The controller may also by coupled to a sensor array 120. The sensor array contains two types of sensors. A first type of sensor determines the operational conditions of the brake activation system. For example, sensors may measure the pressure in the pressure tank, the condition of the compressor, the positions of the valves and the position of the piston arm 42. This information may be used to ensure that the system operates as intended.

A second type of sensor determines whether the towed vehicle should be braked, and if so, then how firmly. In one example, the sensor receives commands from a trailer wiring system of the tow vehicle. In another example, the sensor array includes accelerometers, pitch sensors, pressure sensors, or other sensors to determine whether the tow vehicle is braking. When the sensors determine that the towed vehicle is braking, then the controller can activate the brakes of the towed vehicle to assist. The amount of braking or the firmness of the braking can also be determined using the accelerometers. In this way, if the tow vehicle is braking firmly, then the towed vehicle's brakes will be operated firmly. On the other hand if the tow vehicle is braking gently then the towed vehicle's brakes may also be operated gently. \

The brake activation system may also include a radio frequency (RF) or remote communications subsystem 122. This subsystem is shown as being connected to the sensor array 120 but my alternatively be coupled directly to the controller or to any other part of the system. This system may use any of a variety of wireless or wired standards for communication with remotely located devices. In one example, the RF subsystem receives commands and sends status messages to a control panel in the tow vehicle that the tow vehicle driver can see and operate. The RF subsystem may also communicate with additional sensors at the hitch or in the tow vehicle to obtain additional brake activation information. The RF subsystem may also contain receivers for position information, and transmitters to send an alert if the towed vehicle is lost or stolen.

The system of FIG. 14 is provided as an example only. It may be modified in many different ways to suit different applications. More or fewer components may be used to depending upon cost and accuracy constraints. In addition, additional components may be added to provide additional functions other than activating the braking system. While a pneumatic arm drive is shown, any other type of drive may be used, such as a solenoid, an electromagnetic drive, a stepping motor, etc.

Figure 15:
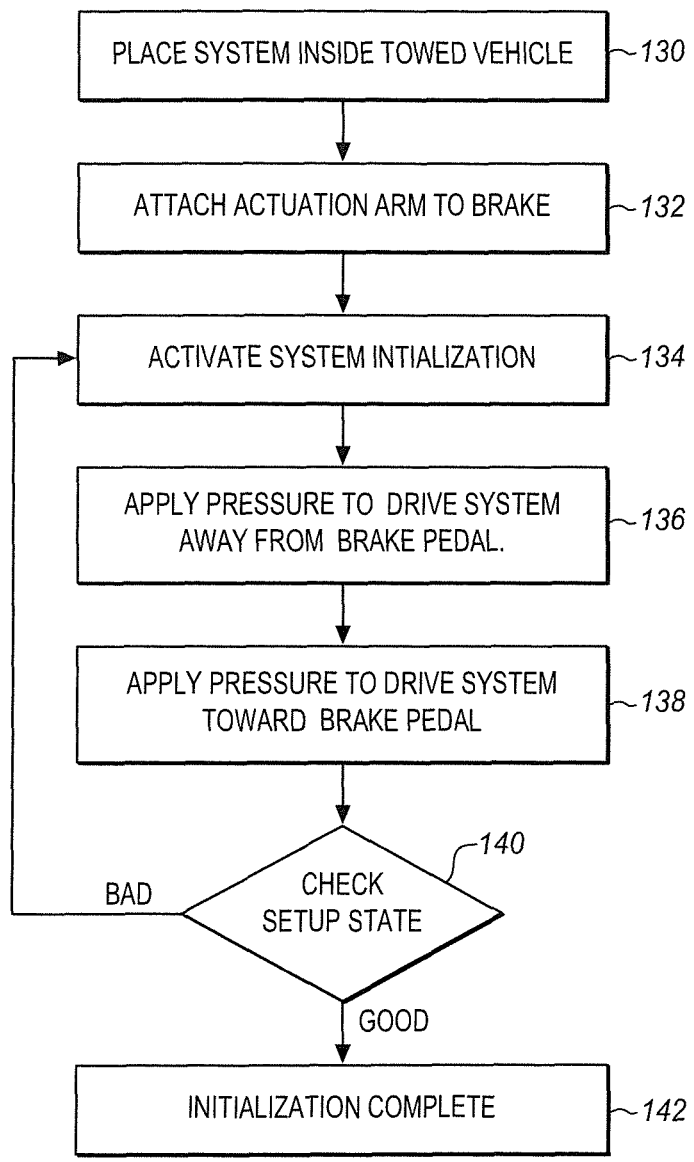
FIG. 15 is a process flow diagram of initializing the system of FIG. 1 inside a towed vehicle.

FIG. 15 shows a process for installing the brake activation system into a towed vehicle and initializing the system using the movable anchor plate shown in FIGS. 3 and 13. At block 130, the brake activation system is placed inside the towed vehicle in a position such as that shown in FIG. 10. This is made easy using its compact storage configuration and convenient handle. In that position, the bottom surface of the system rests on the carpet of the floor pan to hold it in place. The back surface of the system can rest against the back of the floor pan or against the front of the driver's seat.

At the same time the user can make any other appropriate connections. In the described example, the safety cable is attached into the safety socket and the power plug is pulled out of its holder and plugged into a 12V receptacle to power the system.

At block 130, the brake pedal connector is attached to the towed vehicle's brake pedal so that the actuation arm and its drive system are connected to the vehicle brake system. In the illustrated example, the brake pedal connector is lifted upwards to pull its pins out of the retainers in the main housing. The actuation arm or piston rod is pulled out of the cylinder to pull the brake pedal connector away from the main housing and toward the brake pedal. Upon reaching the brake pedal, the upper clevis is pulled away from the base to open up a space between the clevis and the base to place the brake pedal into. The two parts are then closed around the brake pedal to hold the pedal from in front and behind.

Upon attaching the brake pedal connector and any other ancillary equipment, at block 134 the system is activated and an initialization routine is started. The initialization routine may include various sensor calibrations, and power tests, as well as radio and electrical equipment startup. For the pneumatic system described above, the pressure tank will also be pressurized and the pneumatic cylinder may be initialized. At block 136, the actuation arm drive system is activated to drive the arm and the brake pedal connector toward the brake pedal. The pneumatic cylinder may extend to the limit of its travel or until the brake pedal is fully depressed. This will push the system main housing 10 into position on the towed vehicle floor pan and, in some vehicles, may push hydraulic fluid into the vehicle braking system.

When this is done, the system pushes on the brake pedal, or applies the brakes, forcing the grip to move in an opposite direction away from the brake pedal. By pushing against the brakes, the main housing may be pushed rearwards on the floor pan of the vehicle. This motion can be used to slide the main housing against an edge in the floor pan or against the driver's seat. It may alternatively be used simply to push the bottom surface of the housing into the vehicle floor firmly enough to hold it in place.

At block 138, the motion is reversed and activating the arm drives the system to apply pressure to the actuation arm to drive the actuation arm toward the brake pedal. In other words the actuation arm is pulled toward the brake pedal. With a piston rod, the pressure is reversed so that the rod is withdrawn into the piston. In the illustrated example, the brake pedal connector 22 is attached around the back of the brake pedal so that the connector does not become removed from the brake pedal.

In pulling the actuation arm, the cylinder will also be pulled toward the brake pedal. This will allow the anchor plate at the end of the cylinder to be dragged on the ratchet track toward the brake pedal. The anchor plate will ride over the angled teeth until the actuation arm is no longer being withdrawn. The anchor plate is pulled forward over the track of the brake controller to a different position on the track. At that position, when the movement stops the anchor plate will fall into engagement with the teeth of the ratcheting track in a new position.

At block 140 the installation state of the system can be checked using any available sensors. If the arm drive is in place and there is resistance against the brake pedal, then the system can indicate the initialization is complete and be ready for the tow vehicle to be underway. On the other hand, if the system initialization is not complete, then the process may return to block 136 to repeat the operations of applying the brake and pulling away from the brake. In one example, driving the grip away from the brake pedal and driving the actuation arm toward the brake pedal is repeated until the system sensors indicate the system is ready. In another example, the driving operations are repeated a predetermined number of times. These two approaches can be combined so that the driving operations are repeated a predetermined number of times and then the sensors check to determine if the system is ready.

In a current model conventional vehicle with a hydraulic power braking system, in order to operate the brakes with the power assist system turned off, the brake pedal must be pumped. This primes the brake lines with hydraulic fluid when there is no power assist. Repeating the driving operations presents the advantage of pumping the brakes for use without power assist. In one example, the operations are repeated four times. However, more or fewer cycles may be used, depending upon the requirements of the vehicles to be used with the system.

Another advantage of repeating the driving operations is that the position of the anchor plate on the toothed rail can be optimized. In the first cycle, the piston rod may not reach far enough to properly position the drive cylinder on the rail. In the second cycle, the anchor plate on the cylinder can be moved again to bring the arm drive cylinder into a still better position. After three or four repetitions, the position of the cylinder should be optimized and the anchor plate should be securely engaged with the ratchet rail.

A further advantage of the repetitions is that the position of the main housing of the system can also be optimized. With each repetition, the housing may be pushed further back on the floor pan of the towed vehicle. After enough repetition, the bottom surface should be securely engaged with the floor pan or the back surface is securely pushed against an edge of the floor pan or the driver's seat or both.

It is appreciated that a lesser or more equipped brake activation system than the example described above may be desirable for certain implementations. Therefore, the configuration of the system will vary from implementation to implementation depending upon numerous factors, such as price constraints, performance requirements, technological improvements, and/or other circumstances.

It should be noted that, while the steps described herein may be performed under the control of a programmed processor, such as central processing unit, a microcontroller or by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a specific combination of hardware components.

The present description presents the examples using particular terms, such as towed vehicle, brake pedal, actuation arm, arm drive, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

The present invention includes various steps, which can be performed by hardware components or can be embodied in machine-executable instructions, such as software or firmware instructions. The machine-executable instructions can be used to cause a general-purpose or special-purpose processor programmed with the instructions to perform the steps. Alternatively, the steps can be performed by a combination of hardware and software.

The present invention can be provided as a computer program product that can include a machine-readable medium having stored instructions thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
    activating an arm drive system of a brake activation system to apply pressure to an actuation arm, the actuation arm being attached to a brake pedal of a towed vehicle, the actuation arm having a movable connection to a grip of the brake activation system, the pressure to drive the grip away from the brake pedal, the grip to grip a surface of the towed vehicle;
    activating the arm drive system to apply pressure to the actuation arm to drive the actuation arm toward the brake pedal, moving the connection to the grip so that the connection is dragged toward the brake pedal to a new position with respect to the grip; and activating the arm drive system to drive the actuation arm away from the brake pedal, engaging the connection to the grip at the new position.

2. The method of claim 1, further comprising attaching the actuation arm by attaching a spring-loaded clevis at one end of the actuation arm to the brake pedal.

3. The method of claim 1, further comprising connecting the brake activation system to a power supply of the towed vehicle before activating the arm drive system.

4. The method of claim 1, wherein driving the grip away from the brake pedal comprises sliding the grip across the floor of the towed vehicle away from the brake pedal.

5. The method of claim 4, wherein sliding the grip across the floor comprises sliding the grip across the floor between a driver's seat of the towed vehicle and the brake pedal.

6. The method of claim 4, wherein driving the grip away from the brake pedal comprises driving a bottom surface of the brake activation system against the floor of the towed vehicle, the bottom surface having a textured elastomeric cover for contact with the floor pan of the towed vehicle.

7. The method of claim 1, wherein driving the grip away from the brake pedal comprises pushing the brake pedal forcing the grip to move in an opposite direction.

8. The method of claim 1, wherein moving the connection to the grip comprises moving an anchor plate mounted to the actuation arm opposite the brake pedal toward the brake pedal.

9. The method of claim 8, wherein moving the anchor plate comprises pulling the anchor plate forward over a track of the brake activation system to engage a different position on the track.

10. The method of claim 9, wherein the track is a ratcheting track.

11. The method of claim 9, wherein the track has a series of teeth and wherein the anchor plate grips a portion of the teeth to connect to the track.

12. The method of claim 9, wherein moving the anchor plate comprises riding the anchor plate over teeth of the track and wherein engaging a different position comprises falling into engagement with teeth of the rack.

13. The method of claim 1, further comprising repeating driving the grip away from the brake pedal and driving the actuation arm toward the brake pedal.

14. The method of claim 13, wherein repeating comprises repeating until the grip is pushed against an edge of a floor pan of the towed vehicle.

15. The method of claim 1, wherein applying pressure to the actuation arm comprises driving a piston rod in and out of a cylinder.

16. The method of claim 15, wherein the cylinder is pneumatic.

17. An apparatus comprising:
means for activating an arm drive system of a brake activation system to apply pressure to an actuation arm, the actuation arm being attached to a brake pedal of a towed vehicle, the actuation arm having means for movably connecting to a grip of the brake activation system, the pressure to drive the grip away from the brake pedal, the grip to grip a surface of the towed vehicle;
means for activating the arm drive system to apply pressure to the actuation arm to drive the actuation arm toward the brake pedal, moving the connection to the grip so that the connection is dragged toward the brake pedal to a new position with respect to the grip; and
activating the arm drive system to drive the actuation arm away from the brake pedal, engaging the connection to the grip at the new position.

18. The apparatus of claim 17, wherein driving the grip away from the brake pedal comprises pushing the brake pedal to slide the grip across the floor of the towed vehicle away from the brake pedal and wherein driving the actuation arm toward the brake pedal comprises pulling the brake pedal to move the means for movably connecting to the grip.

19. The apparatus of claim 17, wherein moving the connection to the grip comprises moving an anchor plate mounted to the actuation arm opposite the brake pedal toward the brake pedal.

20. The apparatus of claim 19, wherein the means for activating moves the anchor plate by pulling the anchor plate forward over a track of the brake activation system to engage a different position on the track.

21. The apparatus of claim 20, wherein the track is a ratcheting track and the anchor plate engages a different position by falling into engagement with the teeth.

22. A brake activation system comprising:
an actuation arm having a brake pedal connector to connect to a brake pedal of a towed vehicle, the actuation arm having a movable connection to a grip of the brake activation system, the grip to grip a surface of the towed vehicle
an arm drive system to apply pressure to the actuation arm, the pressure to drive the grip away from the brake pedal and to drive the actuation arm toward the brake pedal, moving the connection to the grip so that the connection is dragged toward the brake pedal to a new position with respect to the grip and to apply pressure to the actuation arm to drive the actuation arm away from the brake pedal, engaging the connection to the grip at the new position.

23. The system of claim 22, wherein the brake pedal connector comprises a spring-loaded clevis at one end of the actuation arm to connect to the brake pedal.

24. The system of claim 22, further comprising a vehicle power outlet connector to connect the system to a power outlet of the towed vehicle.

25. The system of claim 22, wherein driving the grip away from the brake pedal comprises sliding the grip across the floor of the towed vehicle away from the brake pedal.

26. The system of claim 22, wherein driving the grip away from the brake pedal comprises pushing the brake pedal forcing the grip to move in an opposite direction.

27. The system of claim 22, wherein the movable connection comprises an anchor plate mounted to the actuation arm opposite the brake pedal connector, wherein moving the connection comprises moving the anchor plate toward the brake pedal.

28. The system of claim 27, wherein the grip comprises a track having a plurality of positions at which the anchor plate may be engaged and wherein moving the anchor plate comprises pulling the anchor plate forward over the track of to engage a different position on the track.

29. The system of claim 28, wherein the track is a ratcheting track.

30. The system of claim 29, wherein the track has a series of teeth and wherein the anchor plate grips a portion of the teeth to connect to the track.

31. The system of claim 30, wherein moving the anchor plate comprises riding the anchor plate over the teeth of the track and wherein gripping a portion of the teeth comprises falling into engagement with teeth of the rack.

32. The system of claim 31, further comprising a hinged connector between the anchor plate and the actuation arm to allow the anchor plate to align with the teeth while riding over the teeth.

33. The system of claim 22, wherein the arm drive system repeats driving the grip away from the brake pedal and driving the actuation arm toward the brake pedal.

34. The system of claim 33, wherein repeating comprises repeating until the grip is pushed against an edge of a floor pan of the towed vehicle.

35. The system of claim 22, wherein the arm drive system comprises a cylinder and the actuation arm comprises a piston rod in the cylinder.

36. The system of claim 35, wherein the cylinder is pneumatic.

37. The system of claim 35, further comprising a hinged connector between the brake pedal connector and the piston rod.

38. The system of claim 22 comprising a housing including the arm drive system, the movable connection and the grip, and wherein the brake pedal connector can be lowered into the housing for storage.

* * * * *